(12) United States Patent
Ratliff, Jr.

(10) Patent No.: US 6,983,777 B2
(45) Date of Patent: Jan. 10, 2006

(54) TIRE TREAD WITH MULTI-PLANAR CHAMFERS

(75) Inventor: Billy Joe Ratliff, Jr., Clinton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 196 days.

(21) Appl. No.: 10/271,086

(22) Filed: Oct. 15, 2002

(65) Prior Publication Data
US 2004/0069389 A1   Apr. 15, 2004

(51) Int. Cl.
B60C 11/13 (2006.01)
B60C 101/00 (2006.01)
B60C 107/00 (2006.01)
B60C 115/00 (2006.01)

(52) U.S. Cl. .......................... 152/209.15; 152/209.21; 152/209.28

(58) Field of Classification Search ........... 152/209.15, 152/209.24, 209.28, 209.21
See application file for complete search history.

(56) References Cited

U.S. PATENT DOCUMENTS

| | | | | |
|---|---|---|---|---|
| 4,481,993 A | | 11/1984 | Ohnishi | 152/209 B |
| 4,690,189 A | | 9/1987 | Bradisse et al. | 152/209 R |
| 5,031,680 A | * | 7/1991 | Kajikawa et al. | 152/209.21 |
| 5,109,903 A | | 5/1992 | Watanabe et al. | 152/209 R |
| 5,293,918 A | | 3/1994 | Tsuda et al. | 152/209 R |
| 5,690,761 A | * | 11/1997 | Masaoka | 152/209.5 |
| 6,076,579 A | | 6/2000 | Matsumoto | 152/209.15 |
| 6,098,681 A | | 8/2000 | Takahashi et al. | 152/209.15 |
| 6,112,787 A | | 9/2000 | Fukumoto et al. | 152/209.15 |
| 6,123,129 A | | 9/2000 | Himuro | 152/209.15 |
| 2001/0017177 A1 | * | 8/2001 | Himuro | 152/209.1 |
| 2002/0062892 A1 | * | 5/2002 | Himuro | 152/209.18 |
| 2002/0100526 A1 | * | 8/2002 | Matsumoto | 152/209.18 |
| 2004/0238092 A1 | * | 12/2004 | Colombo et al. | 152/209.15 |

FOREIGN PATENT DOCUMENTS

| | | | |
|---|---|---|---|
| EP | 0687582 | | 12/1995 |
| EP | 0849101 | | 6/1998 |
| EP | 0875403 | | 11/1998 |
| EP | 925957 | * | 6/1999 |
| EP | 1074405 | | 2/2001 |
| EP | 1075971 | | 2/2001 |
| JP | 2179508 | | 7/1990 |
| JP | 3038410 | | 2/1991 |
| JP | 3-86605 | * | 4/1991 |
| JP | 5319025 | | 12/1993 |
| JP | 7-186623 | * | 7/1995 |
| JP | 11-263104 | * | 9/1999 |
| JP | 2000-247110 | * | 9/2000 |
| JP | 2002-59711 | * | 2/2002 |
| JP | 2002-240513 | * | 8/2002 |
| WO | WO 03/013881 | * | 2/2003 |

OTHER PUBLICATIONS

Machine translation for Japan 2002-240513.*

* cited by examiner

*Primary Examiner*—Steven D. Maki
(74) *Attorney, Agent, or Firm*—Nancy T. Krawczyk

(57) ABSTRACT

A tire has a tread on the outer circumferential surface. The tread has circumferential and lateral grooves defining tread blocks. In at least one tread block, one of the circumferentially extending sides of the block has a multi-planar chamfer.

11 Claims, 5 Drawing Sheets

TIRE TREAD WITH MULTI-PLANAR CHAMFERS

FIELD OF THE INVENTION

The present invention relates to a pneumatic tire, particularly a high-performance tire with improved traction, increased stiffness, and improved wet traction performance. More particularly, the present invention is directed to a tire tread having multi-planar chamfers.

BACKGROUND OF THE INVENTION

In a conventional pneumatic tire, particularly a high-performance tire, the tread pattern is generally formed by combining circumferential grooves extending along the circumferential direction of the tire with a plurality of grooves inclined relative to the circumferential direction. The combination of grooves forms a plurality of tread blocks along the radially outer surface of tire. If the inclined grooves do not extend completely across the equatorial plane of the tire, a central rib may be formed in the tread.

Chamfers and their surface derivatives, usually known as bevels, have been utilized primarily to aid in the protection of non-stable corners or edges of tread blocks. Traditionally, chamfers have been just small angle slices off the corner of tread blocks where a point was considered too weak to hold up to the stresses of contacting the road. Such chamfers are cut at an angle between 30° to 75° from the tread surface.

SUMMARY OF THE INVENTION

The present invention is directed to a tire having a tread with multi-planar chamfers. The tread has circumferentially extending grooves and laterally extending grooves. The circumferentially extending grooves and the laterally extending grooves form at least one circumferentially extending row of blocks. Each block is defined by two circumferentially extending sides formed by the circumferentially extending grooves. At least one block is comprised of a multi-planar chamfer extending along at least one circumferentially extending side of the block.

In one aspect of the invention, the tread has a preferred direction D of rotation when arranged on the outer circumference of the tire and the chamfer is a directional multi-planar chamfer.

In another aspect of the invention, the upper surface of the chamfer is defined by multiple radius of curvatures. The configurations which can be formed by the varying and multiple radii of curvature is numerous. In one configuration, one radius of curvature is below the chamfer surface and one radius of curvature is above the chamfer surface. In another configuration, one radius of curvature has a value approaching infinity, thus forming almost a straight line.

Not just the configuration of the chamfer as viewed from the side may vary, but the configuration as viewed from above may vary. In one configuration, the chamfer forms a point at the corner of the block formed by the circumferential and lateral grooves forming the block. In another configuration, the chamfer has a substantial width at the corner of the block formed by the circumferential and lateral grooves forming the block. In another configuration, the circumferentially extending edge of the chamfer opposite of the groove forming the edge of the chamfer has a curved configuration.

In another aspect of the invention, the surface area of the chamfer is 10 to 35% of the total surface area of the tread block. Preferably, the surface area of the chamfer is 15 to 25% of the total surface area of the tread block.

BRIEF DESCRIPTION OF THE DRAWINGS

The invention will be described by way of example and with reference to the accompanying drawings in which the following elements are illustrated.

DETAILED DESCRIPTION OF THE INVENTION

Figure 1:
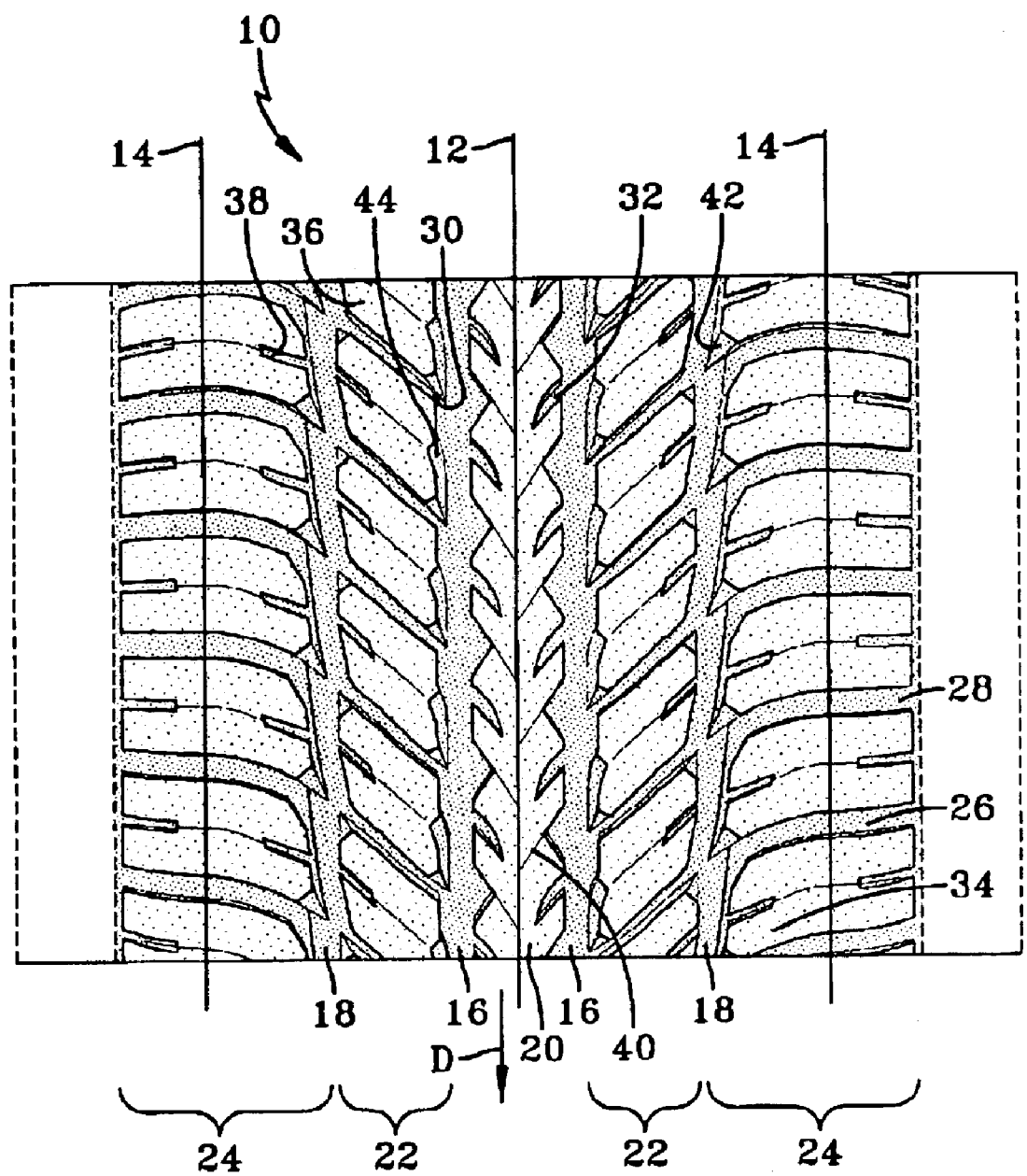
FIG. 1 is a plan view of a tread pattern of a pneumatic tire in accordance with the invention.

In FIG. 1 is shown a tread pattern of a pneumatic tire according to the invention. In the illustrated tread, 10 is the tread, 12 is the equatorial plane of the tread pattern, and 14 are the edges of the ground contacting portions of the tread, also referred to commonly as the tread edges.

In this illustrative tread 10, the tread 10 has a pair of inside circumferential grooves 16 and a pair of outside circumferential grooves 18. Located between the inside circumferential grooves 16 is a central rib 20. In each tread half, between one of the inside circumferential grooves 16 and one of the outside circumferential grooves 18 is an intermediate row 22. Laterally outside of each outside circumferential groove 18 is an outer row 24.

Dividing the intermediate rows 22 and the outer rows 24 into a plurality of blocks are curved lateral grooves 26. Due to the inclined orientation of the lateral grooves 26, the tread 10, when arranged on the ground contacting portion and shoulder regions of a tire, has a preferred mounting orientation, as shown by direction arrow D. Each lateral groove 26 may be defined as having three portions: an outermost portion 28, a central portion 30 and an innermost portion 32. The outermost portion 28 divides the outer rows 24 into outer blocks 34. The central portion divides the intermediate rows 22 into intermediate blocks 36. The innermost portion 32 extends into the central rib 20 but does not bisect the central rib 20. The blocks 34, 36 and the rib 20 may have additional small lateral grooves 38, sipes 40, and traditional single angle chamfers 42. In accordance with the invention, the intermediate blocks have multi-plane biting chamfers 44.

Figure 2A:
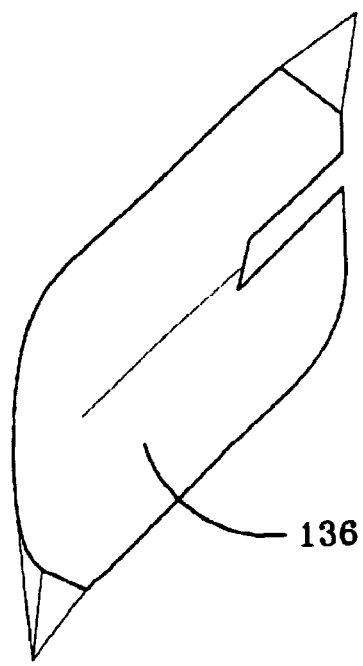
FIG. 2a is a prior art tread block.
Figure 2B:
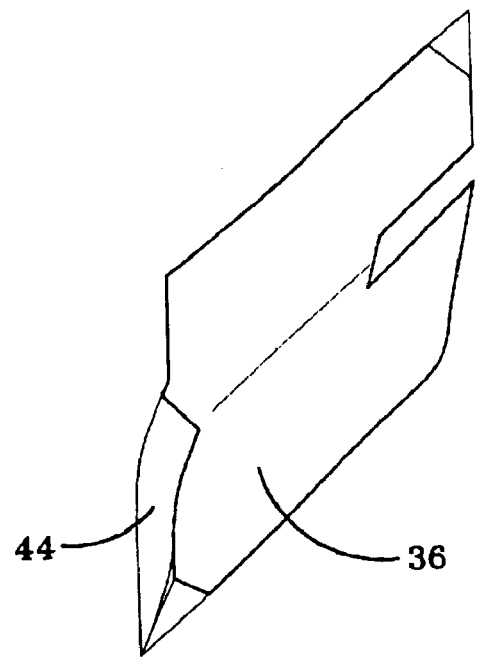
FIG. 2b is a tread block in accordance with the invention.

As seen in FIG. 2a, a prior art tread block 136 has a curved edge forming an outer wall of the adjacent circumferential groove. In accordance with the invention, the curved edge is modified to appear as if a portion of the material of the prior art tread block 136 has been removed, see FIG. 2b, thereby forming a multi-plane biting chamfer 44. The edge of the chamfer 44 that assists in forming the outer wall of the adjacent groove curves to conform to the shape of the block 36 to maintain the overall shape of the prior art block 136. By maintaining a prior art block configuration, the chamfer 44 acts as a secondary buttress to the block 36. The configuration of the chamfer 44 also provides additional biting edges to the block 36.

The chamfer 44 extends downward from the block surface, sloping from the top of the tread surface downward to the bottom of the adjacent groove or grooves. The chamfer 44 extends down between 50% and 100% of the full tread depth at the non-skid level of the tread, i.e. the bottom of the grooves.

Because the chamfer 44 is intended to maintain an overall block configuration, but be multi-planar, there can be many variations in the shape of the chamfer 44. FIGS. 3a to 3d illustrate a number of variations in shape as seen from the side of the block 36, while FIGS. 4a to 4e illustrate a number of variations in shape as seen from the top surface of the block 36.

Figure 3A:
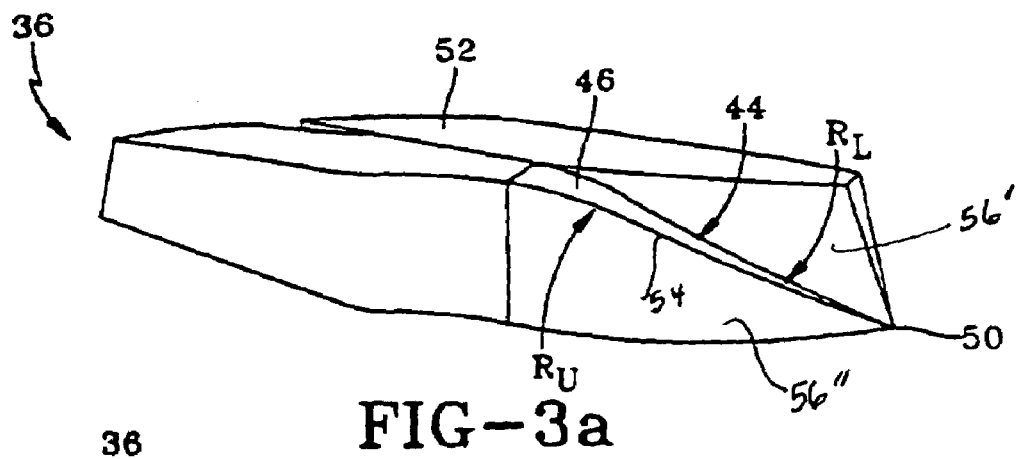
FIGS. 3a to 3d are variations in a tread block as viewed from the side of a tread block.

In the chamfer 44 shown in FIG. 3a, the chamfer 44 begins at the lowermost, inner edge of the block 50, relative to the block surface 52 and intended rotation direction D of the tread. The upper surface 46 of the chamfer 44 gradually slopes upward, the surface slope not being a straight line. As the chamfer surface 46 of approaches the plane coincident with the tread block surface 52, the slope of the chamfer surface 46 gradually changes. Viewed from the side, the lower portion of the chamfer surface may be defined as having a radius of curvature $R_L$ above the chamfer surface 46, while the upper portion has a radius $R_U$ of curvature below the chamfer surface 46. Additionally, the 'removal' of a portion of the block material to form the chamfer 44 creates a second biting edge 54 by splitting the radially extending block wall into separate portions 56', 56" distanced and offset by the chamfer surface 46.

Figure 3B:
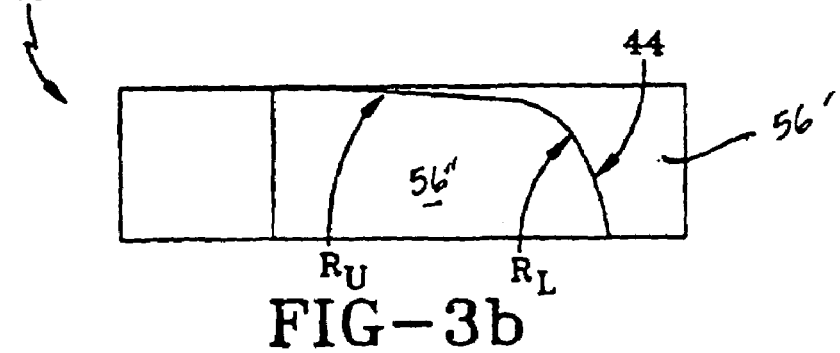

In the chamfer 44 of FIG. 3b, both the upper and the lower portion of the chamfer surface 46 have a radius of curvature below of the chamfer surface 46.

Figure 3C:
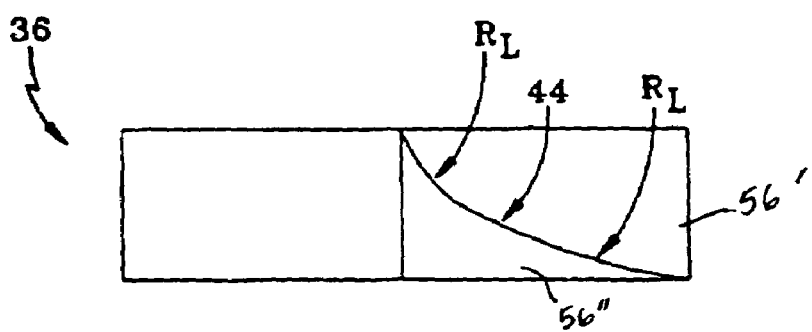

In the chamfer of FIG. 3c, the radius of curvature for each portion of the chamfer surface 46 is above the chamfer surface 46.

Figure 3D:
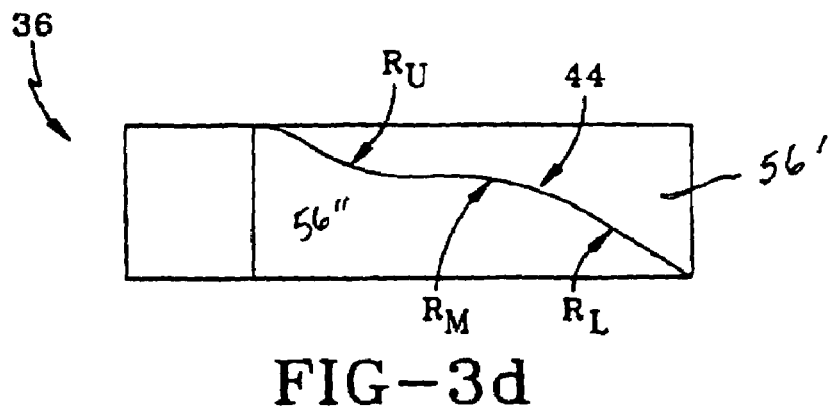
Figure 4A:
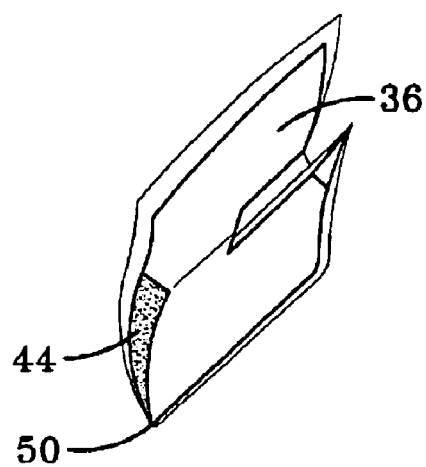
FIGS. 4a to 4e are variations in tread block shape as seen from the top surface of the block.
Figure 4B:
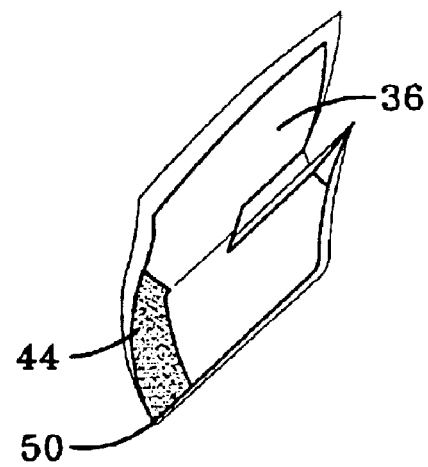
Figure 4C:
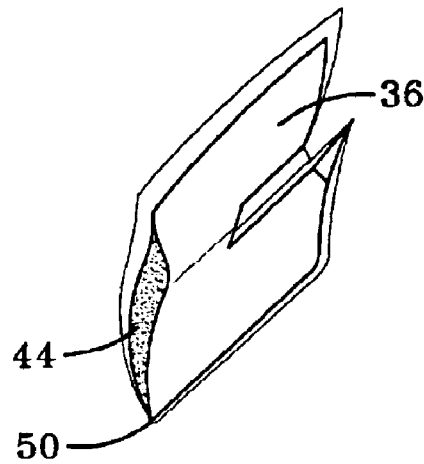
Figure 4D:
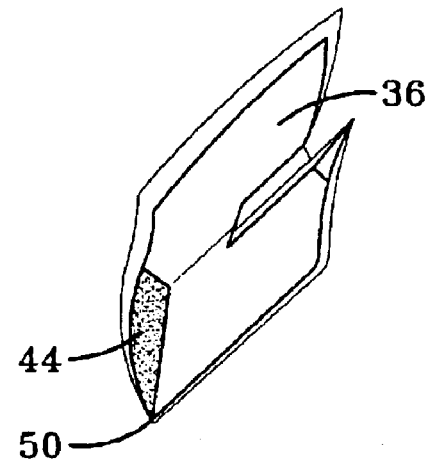
Figure 4E:
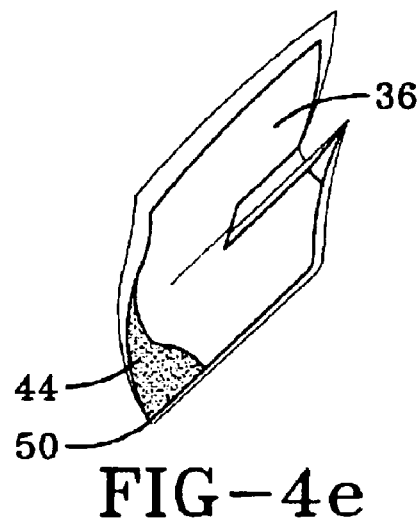

In the chamfer of FIG. 3d, the upper portion of the chamfer 44 has a radius of curvature $R_U$ above the chamfer surface 46 and the middle portion of the chamfer 44 has a radius of curvature $R_M$ below the chamfer surface 46. The radially innermost portion of the chamfer has a radius of curvature $R_L$ approaching infinity, such that the lower portion of the chamfer surface is almost a straight line.

In FIGS. 4a to 4e, a number of, but not all of, various possible configurations for the chamfer 44, as viewed from the block surface. Among the possible configurations, the chamfer 44 can begin as a point at the block corner 50, see FIGS. 4a, 4c, 4d, can increase in width as it extends from the block corner, see FIGS. 4a, 4c, 4d, can narrow in width, see FIGS. 4b, 4e, can have curved lines, see FIGS. 4b, 4c, 4e, or can defined points, see FIGS. 4a, 4b, 4c, 4d.

As seen, the chamfer 44 can have a variety of configurations, so long as the chamfer 44 has a multiplanar configuration. The chamfers 44 of the invention, in addition to conforming to the shape of the tread block 36, are much larger than conventional chamfers 42. The surface, or potential contact, area of the block 36 consumed by an individual chamfer 44 is in the amount of 5 to 35% of the total tread block surface area, including the surface area of the chamfer 44. Preferably, the surface area of the chamfer is 10 to 25% of the block surface area. If multiple chamfers 44 are used in a single tread block 36, such as for a light truck off-road tire application, the total surface area consumed by the chamfers is 10% to a maximum of 70%. If the total chamfer area is greater than 70%, than the tread may have insufficient traction until a level of tread wear has occurred.

By using a chamfer 44 that is curved or sloping downward many benefits in terms of performance and aesthetics can be achieved. Since the chamfers 44 slope from the top of the tread surface, they provide a secondary set of biting edges that are not usually directly related to the tread surface 52 but more to the tread sub depths and tread block walls. This allows for improved snow and mud traction characteristics with negligible reduction in the rolling resistance noise or where characteristics of the tire.

Also since the chamfers 44 are large compared to conventional chamfers 42, and form a part of the tread, the chamfers 44 act almost like a large radius or buttress that provides improved stiffness characteristics. The larger chamfers 44 also allow a tread pattern to have a lower surface net-to-gross ratio to achieve better wet traction performance while maintaining stiffness characteristics associated with higher net-to-gross ratios.

Additionally, at least one plane of the chamfer 44 is curvilinear, so the chamfer 44 has very few corner areas or angular pocket areas are present. This improves the snow evacuation characteristics of the tread since it will not allow as much snow to pack in any pocket areas.

While FIG. 1 illustrates employing the inventive chamfers 44 on the edge of the blocks 36 forming the axially outer side of the innermost circumferential grooves, the chamfers 44 may be employed along the circumferentially extending sides of any of the tread elements, including rib 20, blocks 36, and blocks 34.

Figure 5:
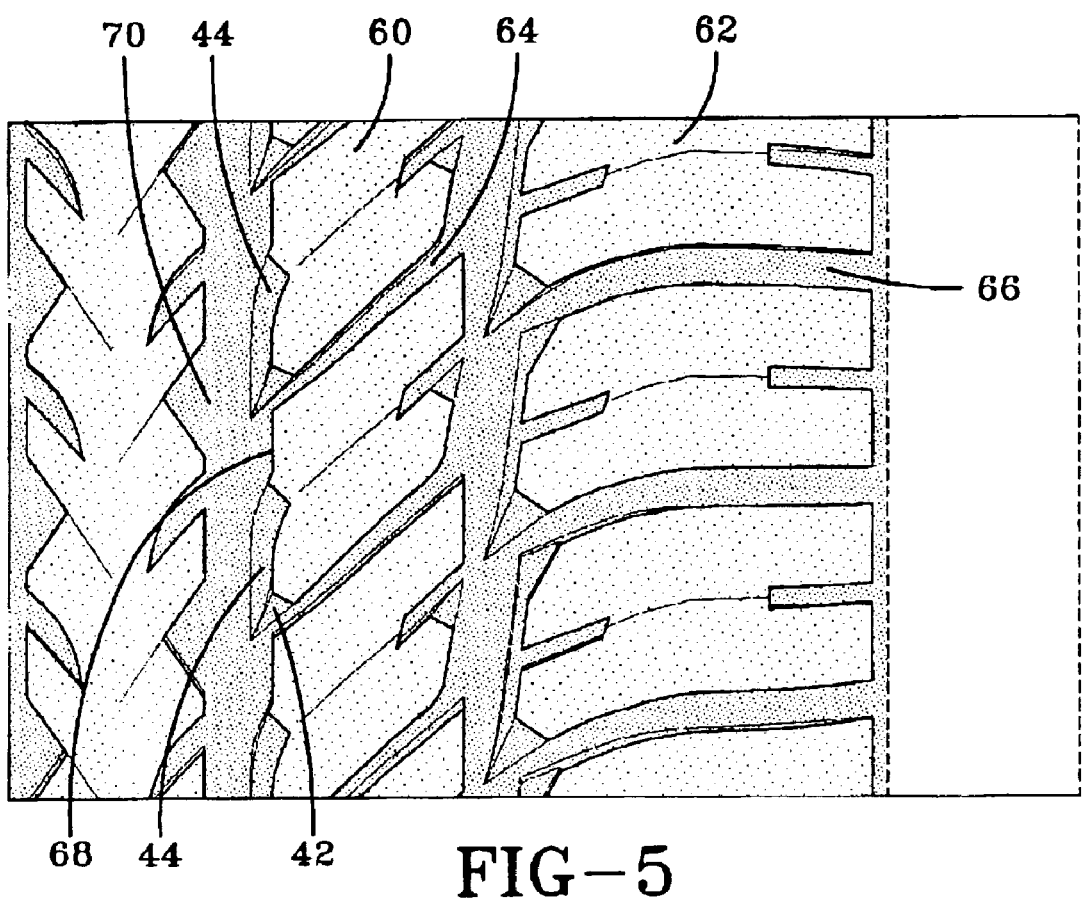
FIG. 5 is a portion of another tread pattern incorporating a chamfer in accordance with the invention.

FIG. 5 is a portion of another tread pattern. Illustrated are just intermediate tread blocks 60 and outer blocks 62. The lateral grooves 64, 66 forming the tread blocks 60, 62 do not extend completely across from the tread half. Instead, one set of lateral grooves 66 form the outer blocks 62 and terminate in the intermediate tread blocks 60, while another set of lateral grooves 64 initiate in the outer blocks 62 and form the intermediate blocks 60. The inventive chamfers 44 are located along the axially inner side 68 of the intermediate blocks 60, forming the axially outer side of the adjacent circumferential groove 70. The chamfer 44 may also be combined with a conventional single sloped chamfer 42.

FIGS. 1 and 5 illustrate passenger type tread patterns. However, the chamfers 44 may be used in treads for light truck tires. In such an instance, the additional biting surfaces generated by the chamfers 44 will assist in providing a more aggressive tread pattern, in both a visual aspect and a performance aspect.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire tread comprising circumferentially extending grooves and laterally extending grooves, the circumferentially extending grooves and laterally extending grooves forming at least one circumferentially extending row of blocks wherein each block is defined by two circumferentially extending sides formed by the circumferentially extending grooves, and at least one block is comprised of a multi-planar chamfer extending along at least one circumferentially extending side of the block, the chamfer having an upper surface that, for the circumferential length of the chamfer, splits the side of the block into only two separate portions, the portions being offset by the chamfer upper surface that extends from the tread surface to 100% of the non-skid depth of the tread, creating a biting edge extending along the circumferentially extending side of the block.

2. A tire tread in accordance with claim 1 wherein the chamfer is a directional multi-planar chamfer.

3. A tire tread in accordance with claim 1 wherein the upper surface of the chamfer is defined by multiple radius of curvatures.

4. A tire tread in accordance with claim 3 wherein the multiple radii of curvature comprise one radius of curvature below the chamfer surface and one radius of curvature above the chamfer surface.

5. A tire tread in accordance with claim 3 wherein one radius of curvature has a value approaching infinity.

6. A tire tread in accordance with claim 1 wherein the chamfer forms a point at the corner of the block formed by the circumferential and lateral grooves forming the block.

7. A tire tread in accordance with claim 1 wherein the chamfer has a substantial width at the corner of the block.

8. A tire tread in accordance with claim 1 wherein the upper surface of the chamfer has a circumferentially extending edge of the chamfer adjacent to the block and distanced from the biting edge of the chamfer, and the circumferentially extending edge has a curved configuration.

9. A tire tread in accordance with claim 1 wherein the surface area of the upper surface of the chamfer is 5 to 35% of the total surface area of the tread block including the upper surface of the chamfer.

10. A tire tread in accordance with claim 1 wherein the surface area of the upper surface of the chamfer is 10 to 25% of the total surface area of the tread block including the upper surface of the chamfer.

11. A tire tread in accordance with claim 1 wherein the at least one block has a multi-planar chamfer extending along both circumferentially extending sides of the block.

* * * * *